(12) United States Patent
Frost et al.

(10) Patent No.: US 8,914,057 B2
(45) Date of Patent: Dec. 16, 2014

(54) CELLULAR COMMUNICATIONS NETWORK OPERATION

(75) Inventors: Timothy James Frost, Newbury (GB); Assen Mahaboob Khan Golaup, Newbury (GB); MingKai Nan, Newbury (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 519 days.

(21) Appl. No.: 13/281,831

(22) Filed: Oct. 26, 2011

(65) Prior Publication Data

US 2012/0129565 A1 May 24, 2012

(30) Foreign Application Priority Data

Oct. 28, 2010 (GB) .................................. 1018211.1
Jun. 20, 2011 (GB) .................................. 1110380.1

(51) Int. Cl.
*H04B 7/00* (2006.01)
*H04B 7/02* (2006.01)
*H04W 52/14* (2009.01)
*H04W 52/02* (2009.01)
*H04W 52/40* (2009.01)

(52) U.S. Cl.
CPC ................ *H04W 52/40* (2013.01); *Y02B 60/50* (2013.01); *H04B 7/022* (2013.01); *H04W 52/143* (2013.01); *H04W 52/0206* (2013.01)
USPC ............ 455/522; 455/69; 455/500; 455/517; 455/509; 455/436; 370/328; 370/329; 370/331; 370/332; 370/343

(58) Field of Classification Search
USPC ................ 455/522, 69, 500, 517, 127.1, 509, 455/436–444, 432.1–432.5, 513, 67.11, 455/515, 550.1, 426.1, 426.2, 412.1, 412.2; 370/310, 328, 329, 331, 332, 338, 343
See application file for complete search history.

(56) References Cited

U.S. PATENT DOCUMENTS

| | | | |
|---|---|---|---|
| 2004/0131029 A1* | 7/2004 | Tobe et al. ..................... | 370/331 |
| 2007/0280159 A1 | 12/2007 | Liu et al. | |
| 2008/0089292 A1* | 4/2008 | Kitazoe et al. ................ | 370/331 |
| 2008/0232326 A1* | 9/2008 | Lindoff et al. ................ | 370/332 |
| 2010/0157948 A1* | 6/2010 | Zeira et al. .................... | 370/332 |
| 2011/0070881 A1 | 3/2011 | Hwang et al. | |
| 2012/0115467 A1 | 5/2012 | Conte et al. | |

FOREIGN PATENT DOCUMENTS

| | | |
|---|---|---|
| EP | 1120984 A1 | 8/2001 |
| EP | 2 056 628 A1 | 5/2009 |
| EP | 2 107 840 A2 | 10/2009 |
| EP | 2 299 759 A1 | 3/2011 |
| WO | WO 98/57516 | 12/1998 |
| WO | WO 01/47145 A2 | 6/2001 |

(Continued)

*Primary Examiner* — Keith Ferguson

(74) *Attorney, Agent, or Firm* — Muirhead and Saturnelli, LLC

(57) ABSTRACT

A system and method are provided for operating a cellular communications network including a first base station and a second base station. The method comprises reducing the downlink transmission power of the second base station and increasing the downlink transmission power of the first base station, based upon the level of data traffic being communicated through the second base station; and receiving an initial uplink transmission from a mobile station at the second base station and identifying that the second base station can provide a communications service to the mobile station.

19 Claims, 2 Drawing Sheets

(56) References Cited

FOREIGN PATENT DOCUMENTS

| WO | WO 2009/142445 A2 | 11/2009 |
| WO | WO2010/018158 A1 | 2/2010 |
| WO | WO2010/077193 A1 | 7/2010 |
| WO | WO 2010/084282 A1 | 7/2010 |
| WO | WO2010/104433 A1 | 9/2010 |
| WO | WO 2010/104433 A1 | 9/2010 |
| WO | WO 2012/004663 A2 | 1/2012 |
| WO | WO 2012/005657 A1 | 1/2012 |

* cited by examiner

CELLULAR COMMUNICATIONS NETWORK OPERATION

TECHNICAL FIELD

This application relates to a mobile cellular communications network and a method for operating a mobile cellular communications network.

BACKGROUND OF THE INVENTION

Reducing energy consumption in mobile cellular networks is a significant goal. It would therefore be desirable to switch off the Power Amplifier (PA) of a Base Station in the network, when it is not required. The PA consumes a significant amount of energy.

Existing ideas for switching off a PA in a Base Station relate to situations where more than one PA is used on the same sector. Switching off one PA when there is no need for the additional data traffic capacity is useful. However, even when there are no users requiring any data traffic, the Base Station continues to provide a full downlink service in that sector, which still leads to unnecessary energy consumption.

Self-Optimised Networks have been suggested. In this context, flexible network planning might be considered, whereby cells can modify their transmission power, for example to cover coverage holes.

There are a number of existing options for dynamically extending cell coverage. Smart antennas have been developed that can dynamically modify the coverage of a cell, for example, by changing the antenna radiation pattern and using the increased antenna gain in a certain direction and additional power available to extend the cell range. Also, the use of a multi-carrier PA in the Base Station provides that there may be excess power not being used in a particular sector, and this power could be used on one carrier to extend coverage.

Even with these existing technologies, matching the energy consumption to the required data traffic throughput remains a challenge in network planning.

SUMMARY OF THE INVENTION

According to the system described herein, a method is provided for operating a cellular communications network that comprises a first base station and a second base station. The method comprises: reducing the downlink transmission power of the second base station and increasing the downlink transmission power of the first base station, based upon the level of data traffic being communicated through the second base station; and receiving an initial uplink transmission from a mobile station at the second base station and identifying that the second base station can provide a communications service to the mobile station. Advantageously, the step of identifying comprises identifying that the second base station can provide a communications service to the mobile station with better performance than the first base station. Better performance may be determined on the basis of one or more of: signal quality; data rate; error rate; Quality of Service; delay; or other suitable communications link performance indicators. The method may further comprise receiving further uplink transmissions from the mobile station (or another mobile station) at the second base station in response to the identification.

Increasing the downlink transmission power of a base station increases its coverage area. Increasing the downlink transmission power of the first base station provides coverage that the second base station is no longer providing once its downlink transmission power has been reduced. The mobile station is initially camped on a cell of the first base station. Using the receiver of the second base station to receive uplink transmissions provides that the transmitter of the second base station can be partially or fully deactivated, providing a significant reduction in energy consumption. As explained above, the normal downlink coverage area of the second base station is covered by the extended downlink coverage area of the first base station.

The mobile station located in the (now deactivated) normal downlink coverage area of the second base station, but camped (monitoring downlink control channels) on the cell of the first base station, uses the uplink coverage provided by the receiver of the second base station. In this way, uplink transmissions from the mobile are relayed from the second base station to the first base station, which effectively extends the uplink coverage of the first base station uplink cell.

Optionally, the step of reducing the downlink transmission power of the second base station comprises setting the downlink transmission power of the second base station as zero. In an embodiment, the step of reducing the downlink transmission power of the second base station and increasing the downlink transmission power of the first base station, based upon the level of data traffic being communicated through the second base station may be based on a determination that no data traffic is being communicated through the second base station. Alternatively, the level of data traffic may be set using a threshold based on the data capacity of the second base station, for example less than 5%, 10% or 25% of the data capacity.

The step of identifying that the second base station may provide a communications service (or a communications service with better performance) to the mobile station comprises identifying that the initial uplink transmission was intended for the first base station. Optionally, the step of identifying that the second base station can provide a communications service (or a communications service with better performance) to the mobile station comprises identifying that the second base station can provide a better communications service to the mobile station than the first base station in one or both of uplink and downlink.

In some embodiments, the method further comprises: communicating the initial uplink transmission or the further uplink transmissions received from the mobile station at the second base station to the first base station; and sending downlink transmissions from the first base station to the mobile station. Here, the second base station may act as a relay for some time.

Advantageously, the method further comprises: receiving the initial uplink transmission or the further uplink transmissions from the mobile station at the first base station; and combining, at the first base station, the communicated respective initial uplink transmission or the further uplink transmissions received at the second base station and the further uplink transmissions received at the first base station. This diversity combining is another way of extending the uplink coverage of the first base station using the receiver of the second base station, but allows maximization of the power received in total by the system, to give a further improvement in uplink coverage. The transmitter of the second base station can remain deactivated. The step of communicating the further uplink transmissions received from the mobile station at the second base station to the first base station may comprise communicating the initial uplink transmission or the further uplink transmissions converted to baseband but undecoded, or alternatively the initial uplink transmission or the further uplink transmissions at least partially decoded (this may be soft-decoded data) or the initial uplink transmission or the further uplink transmissions fully decoded. In this way, different forms of diversity combining can be effected. The first base station or second base station may determine a weight value for the further uplink transmissions received from the mobile station at the second base station. This weight value can be used in the diversity combining and may be based upon the received signal strength for the mobile station.

Optionally in these embodiments, the method may further comprise: establishing that the second base station should provide an uplink communication service to the mobile station; increasing the downlink transmission power of the second base station and reducing the downlink transmission power of the first base station in response to the establishment; and communicating further downlink transmissions from the second base station to the mobile station. In this case, the second base station transmitter may be partially or fully activated. The decision as to when to activate the second base station transmitter may be based on the weight value determined by the first base station based on information it receives from the second base station. This weight value may be compared with a threshold, which may be absolute or based on a weight value determined by the first base station relating to the signal it received from the mobile station. In other words, the comparison may determine whether the first base station thinks the second base station can provide a more effective service than the first base station.

In another embodiment, the method further comprises: increasing the downlink transmission power of the second base station and reducing the downlink transmission power of the first base station in response to the identification; and communicating downlink transmissions from the second base station to the mobile station. Here, the second base station downlink transmitter is made partly or fully active once it is determined that the second base station is suited to providing a service to the mobile station.

This determination may require a number of steps. The method may further comprise: communicating information about the initial uplink transmission from the second base station to the first base station, in response to the reception of the initial uplink transmission at the second base station, the step of identifying that the second base station can provide a communications service (or a communication service with better performance) to the mobile station being carried out at the first base station. Then, the method beneficially further comprises forwarding from the second base station to the first base station information to allow the first base station to make the identification.

Optionally, the cellular communications network may further comprise a third base station. Then, the method may further comprise: receiving the initial uplink transmission from the mobile station at the third base station; and communicating information about the initial uplink transmission from the third base station to the first base station in response to the reception of the initial transmission at the third base station. Here, the step of identifying that the second base station can provide a communications service (or a communication service with better performance) to the mobile station may be carried out at the first base station and may comprise identifying that the second base station can provide a better communications service to the mobile station than the first base station and the third base station.

In an embodiment, the initial uplink transmission may comprise a RACH transmission sent by the mobile station. Further uplink transmissions may then comprise RRC messages and optionally data being forwarded to the first base station. Then, the method may further comprise: transmitting one of: an RRC Connection Reject message; an RRC Connection Release message; and a handover message from the first base station to the mobile station, to direct the mobile station to receive downlink transmissions from the second base station. The message used may depend on the stage of the connection establishment at the point when the first base station becomes aware that the second base station is better for providing a communications service.

When the initial transmission is from a mobile station that already has an RRC connection established via the first base station, the method may further comprise: transmitting one of: an RRC Connection Release message; or a handover message from the first base station to the mobile station, to direct the mobile station to receive downlink transmissions from the second base station.

There are a number of features that may be applicable to all embodiments. For example, the downlink transmissions for the first base station and the second base station may optionally be made on the same carrier frequency. Alternatively, they may be made on different carrier frequencies. In other words, the downlink transmissions for the first base station and the second base station do not share the same carrier frequency.

In some embodiments, the step of identifying that the second base station can provide a communications service to the mobile station may comprise: determining that the signal strength of the initial uplink transmission from the mobile station as received at the second base station is at least a threshold value. The threshold value may be absolute or predetermined or it may be determined relative to measurements with respect to other base stations for the same mobile station.

Optionally, the downlink transmission power of the first base station defines a coverage area for the first base station. Then, the method may further comprise: instructing all mobile stations within the coverage area of the first base station and, optionally camped (monitoring downlink control channels) on a cell of the first base station, to use a Random Access Channel associated with the first base station, in response to the step of increasing the downlink transmission power of the first base station. Here, the second base station may receive the initial uplink transmission from a mobile station over the Random Access Channel associated with the first base station.

In embodiments, the first base station, second base station or both may use Orthogonal Frequency Division Multiplex, OFDM, communications. The first base station, second base station or both may advantageously use the 3GPP Long Term Evolution (LTE) Radio Access Technology. Alternatively, other Radio Access Technologies may be used, for example Wideband Code Division Multiple Access (W-CDMA) communications or FDMA/TDMA communications.

The system described herein may also be embodied in a computer program operable to carry out the method described herein. The computer program may be split into parts, each of which is operational at a different location.

In another aspect, the system described herein may be found in a cellular communications network, comprising: a first base station, arranged to provide a first communications coverage area defined by its downlink transmission power; a second base station, arranged to provide a second communications coverage area defined by its downlink transmission power; and a controller, arranged to cause a reduction in the downlink transmission power of the second base station and to cause an increase in the downlink transmission power of the first base station, based upon the level of data traffic being communicated through the second base station. The second base station is further configured to receive an initial uplink transmission from a mobile station and the controller is further configured to identify that the second base station can provide a communications service to the mobile station. Advantageously, the controller is configured to identify that the second base station can provide a communications service to the mobile station with better performance than the first base station. The controller may be further configured, in response to the identification, to cause the second base station to receive further uplink transmissions from the mobile station. Optionally, the controller is further arranged to provide instructions to the first base station and second base station to indicate that downlink transmissions should be provided from the second base station.

Advantageously, the controller may form part of the first base station, second base station or its functionality may be split between the two base stations. Additionally or alternatively, part or all of the controller may be implemented in a separate entity.

It will be understood that the cellular communications network can optionally comprise features used to implement any of the method features described above. Also, any combination of the features described may be implemented, even though not explicitly disclosed.

BRIEF DESCRIPTION OF THE DRAWINGS

Embodiments of the system described herein will now be explained by way of example only and with reference to the accompanying drawings in which.

DETAILED DESCRIPTION OF VARIOUS EMBODIMENTS

Figure 1:
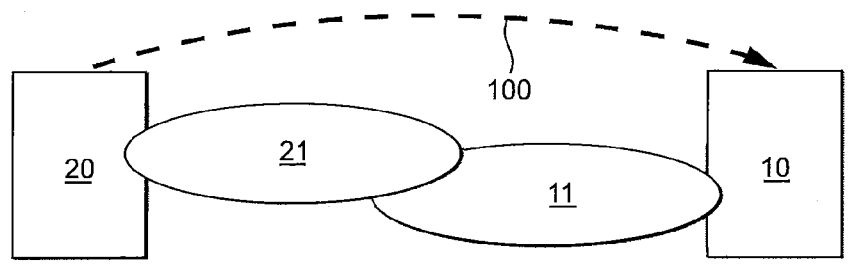
FIG. 1 shows a schematic illustration of a cellular network at a first stage according to a first embodiment of the system described herein.

Referring first to FIG. 1, there is shown a schematic illustration of a cellular network at a first stage according to a first embodiment of the system described herein. The cellular network comprises a first base station 10 and a second base station 20. The downlink coverage area 11 for the first base station at the first stage and the downlink coverage area 21 for the second base station at the first stage are shown.

Although the term Base Station is used here, the skilled person will appreciate that it is to be understood in a generic sense. The term cell is also used interchangeably with Base Station. Moreover, these terms are not limited to a particular network or Radio Access Technology. In particular, the Base Station can include the Node B/RNC of a UTRAN or eNodeB of an E-UTRAN or BTS/BSS of a GERAN. Multiple base stations or cells may have co-located antennas or other equipment, but provide different coverage areas. These may include sectors of a cell coverage area. Also, the terms mobile station, mobile terminal and User Equipment (UE) will be used interchangeably below. The proposed improvement would work for all combinations of radio access technologies using any carrier frequencies, as the skilled person will follow.

The first embodiment allows improved energy-saving between Base Station sites by temporarily switching off a cell that is covered by the coverage of another cell. Such a cell is referred to as a "covered cell", for example the second base station 20. This method permits the deactivation of the whole transmission (including each PA of the transmitter) for the covered cell, and using another cell (or cells), for example first base station 10, to compensate for the coverage of this cell. Such a compensating cell is called a "covering cell". In other words, the downlink coverage for the covered cell may be completely de-activated.

However, it is difficult to de-activate effectively the whole covered cell transmission, when the covered cell does not have the same downlink coverage area as the covering cell. A mobile station should desirably report measurements about the presence of the covered cell. Without downlink transmissions from the covered cell, this would not be possible and it may be impossible to determine when to activate the covered cell again for improved system performance.

In FIG. 1, the first Base Station 10 is acting as a covering cell in a first sector. The second Base Station 20 is planned to act as a covered cell in a second sector. However, the second Base Station 20 has no user traffic within its second sector coverage area 21, but there are UEs in an idle mode.

At the first stage, the second Base Station 20 sends an indication communication 100 to the first Base Station 10 informing it that the second Base Station 20 has no traffic to serve on the second sector.

Figure 2:
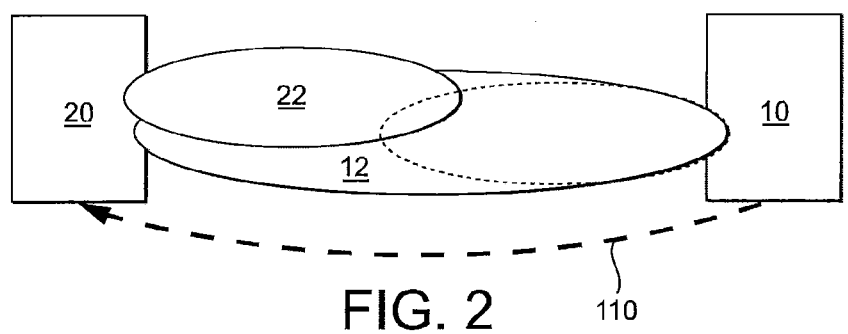
FIG. 2 shows a schematic illustration of the cellular network of FIG. 1 at a second stage.

Referring next to FIG. 2, there is shown the embodiment of FIG. 1 at a second stage. In response to the indication communication 100, the first base station 10 sets the common channel power of its transmitted cell on the first sector to adjust its coverage area to a second coverage area 12. The second Base Station 20 reduces the common channel power of its transmitted cell to zero.

The second Base Station 20 sets its uplink receiver on the second sector to start listening for Random Access Channel (RACH) communications from UEs that are within the uplink coverage area 22, and use the RACH configuration of the cell transmitted by first Base Station 10. The RACH transmissions from the UE, which are intended to indicate to the first Base Station 10 that the UE wishes to make a call (which may be originating from the UE or which alternatively is in response to downlink paging from the first Base Station 10).

The second Base Station 20 has information about the RACH parameters of the first Base Station 10, either through reading system information broadcast from the first Base Station 10 cell, or by receiving the information through network signalling via the transport network connecting the first Base Station 10 and the second Base Station 20. This is indicated by information communication 110. The second Base Station 20 may also be provided with information about uplink timing, as well as the uplink dedicated physical channel configurations used by any UEs actively transmitting data, used in the cell transmitted on the first Base Station 10, first sector. The network can remain in the stage indicated by FIG. 2 for some time.

Figure 3:
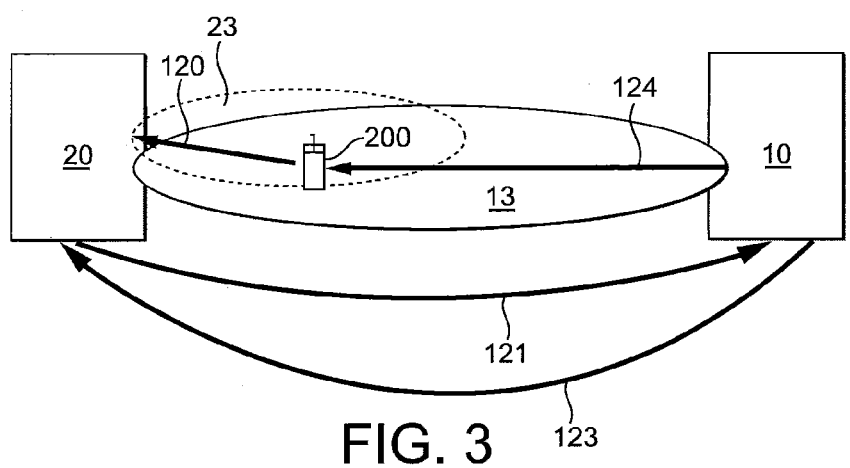
FIG. 3 shows a schematic illustration of the cellular network of FIG. 1 at a third stage.

Referring next to FIG. 3, there is shown the embodiment of FIG. 1 at a third stage. The second Base Station 20 receives a random access request 120 from a UE 200. The random access request 120 has a received power (or signal strength)

higher than a threshold set in dBm. In this case, the second Base Station 20 will decode the random access request 120 and will decode subsequent transmissions from the UE, which may be an RRC CONNECTION REQUEST message (relevant for UMTS and LTE radio access technologies) or a CELL UPDATE message (relevant for UMTS radio access technology). Once decoded, it sends an information message 121 to the first Base Station 10. The information message 121 comprises relevant information, such as received RACH power value and possibly the temporary network identity of the UE 200. The second Base Station 20 may also acquire information on the downlink channel quality from the UE transmission, and this may also be provided to the first Base Station 10 as part of the information message 121.

On receiving the information message 121 from the second Base Station 20, the first Base Station 10 compares the received power level and downlink channel quality values with those provided by other Base Stations that are providing coverage to the UE 200 and that the first Base Station 10 cell downlink transmission may be covering. This may allow it to select which Base Station may need to activate its transmission.

In the scenario depicted in FIG. 3, the first Base Station 10 decides that the second Base Station 20 can provide coverage to the UE 200. The first Base Station 10 then instructs the second Base Station 20 to activate downlink transmission in the second sector, by instruction message 123.

Once downlink transmission by the second Base Station 20 on the second sector has been activated, the first Base Station 10 sends a redirection (this could be an RRC Connection Reject (UMTS) or RRC Connection Release message for UMTS and LTE radio access technologies) or handover message 124 to the UE 200, depending on the stage of the RRC connection establishment at the first base station. The UE 200 is then re-directed to access the second base station 20 (either re-attempting call establishment or completing the handover) using the access parameters of the second Base Station 20. Even in this case, the downlink coverage area 13 of the first Base Station 10 remains large, although the downlink coverage area 23 of the second Base Station 20 is now increased.

Figure 4:
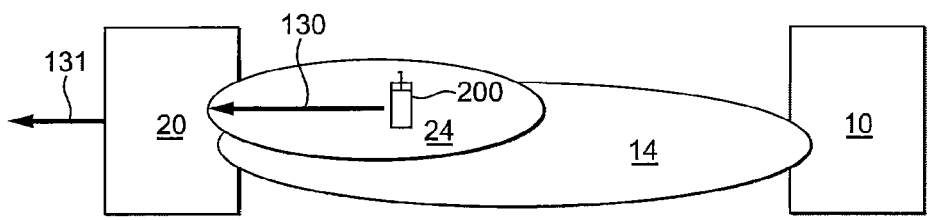
FIG. 4 shows a schematic illustration of the cellular network of FIG. 1 at a fourth stage.

Referring next to FIG. 4, there is shown the embodiment of FIG. 1 at a fourth stage. The UE 200 sends a RACH message 130 to the second Base Station 20 in order to establish the call. Knowing that the second Base Station 20 downlink transmission has been established with an expanded coverage area 24, the first Base Station 10 may decrease the common channel power of the first sector 1 to that of the initial conditions. The downlink coverage area 14 for the first base station may then reduce to the initial coverage area 11 shown in FIG. 1.

When the UE 200 stops data transfer with the second Base Station 20 on its second sector, and no other UEs are transferring data in this cell, the second Base Station 20 may inform the first Base Station 10 of this, using the same procedure as described above and shown in FIG. 1. Then, the first Base Station 10 may use this information to extend its own common channel power on the first sector to cover again the second sector coverage of the second Base Station 20. Following this, the first Base Station 10 may instruct the second Base Station 20 to ensure that all UEs re-select to the cell of the first Base Station 10 providing extended downlink coverage, by modifying cell re-selection parameters, if necessary in the system information sent on the broadcast channel. The second Base Station 20 may then subsequently switch-off transmission on its second sector.

To summarise this first embodiment, the covered cell (second Base Station 20) is arranged to passively listen on the uplink of the covering cell (first Base Station 10), and when it receives an access request from a nearby UE 200 with a strong signal, it will indicate to the Base Station controlling the covering cell that a UE is attempting access on it. The Base Station managing the covered cell may also send relevant information to the Base Station managing the covering cell. This information allows the Base Station controlling the covering cell to decide whether it should re-direct the call from the UE to the covered cell, where the UE may get a much better service. If the Base Station managing the covered cell is provided with information about the uplink Random Access Channel timing and configuration in the covering cell, such information could be used to assist in the detection of random access requests from a UE, and allow the covered cell Base Station to distinguish which cell the UE is currently camped in.

This could also be employed for a UE in a connected mode by the Base Station managing the covering cell sending the Base Station managing the covered cell information about the physical channel configuration used by each UE that is performing data transfer that the covering cell is serving, such that its receiver can detect when such a UE is within its vicinity.

The footprint or range of cells in the Base Station may be extended or reduced dynamically over time. Hence the role of covering and covered cell may be temporary or permanent for any given cell. As well as modification of the downlink power to do this, adaptive antennas can be used to effect such changes.

In the above description, it is assumed that two Frequency Division Duplex (FDD) channels are available, f1 and f2 and that the first Base Station 10 in the first sector transmits on frequency f1 and the second Base Station 20 in the second sector transmits on frequency f2. However, the skilled person will understand that this embodiment may alternatively be implemented where the first Base Station 10 in the first sector and the second Base Station 20 in the second sector transmit with the same carrier frequency, with everything else (for example, sector configurations) remaining the same.

In such a case due to likely interference between the cell transmission of the first sector on the first Base Station 10 and the cell transmission of the second sector on the second Base Station 20 (when the downlink transmit power is activated), when the Base Station 20 starts to reactivate its transmission power, the first Base Station 10 reduces its downlink transmission power. The UE 200 should have received a command on the downlink of the first Base Station 10 to move its connection to the cell of the second Base Station 20. The command should only be sent to the UE 200 if the first base station 10 has received confirmation that the second base station 20 is switched on and broadcasting all relevant system information.

However, to prevent the switching command from being interfered with, it may be desirable for the second base station 20 to start with a low transmit power and wait for a command from the first base station 10 to ramp up its transmit power after having sent the command to the UE 200. This would allow the first base station 10 to send its command without interference or with minimum interference from the second base station 20. As an optional feature, the UE may be instructed to delay access to the second base station 20 to allow time for the second base station to ramp up its transmit power to a level where the UE 200 can acquire the system information.

Thus, there may need to be a more gradual and synchronised transition to reduce the common channel power on the first sector of the first Base Station 10, whilst increasing the common channel transmission power on the second sector of the second Base Station 20. Unless this transition is performed cautiously, this action may still cause some interruption to the call setup process for the UE 200.

There may be other alternative implementations that the skilled person would understand. Although FIG. 1 indicates that the second Base Station 20 informs the first Base Station 10 that it has no traffic to serve, the skilled person will appreciate that this information could be provided by other sources, internal or external to the network. Also, the second Base Station 20 could provide an indication that it has a reduced traffic to serve, in some circumstances, rather than no traffic at all.

It should be noted that the procedure may be different from that noted above in respect of the re-direction of the UE 200, depending on the stage of the RRC Connection establishment at the point where the first Base Station 10 receives any information from the second Base Station 20 about the UE 200.

Also, the functionality controlling the activation and deactivation of the second Base Station 20 and the increase and decrease in coverage of each cell could be a server external to the first Base Station 10 and second Base Station 20, for example an external controller. The controller may have distributed functionality between different hardware and software components.

In the embodiment shown in FIGS. 1 to 4, the second Base Station 20 receives uplink RACH transmission from the UE 200 and decodes this information. It then simply forwards the information about the UE to the first Base Station 10. However, an alternative embodiment is also envisaged in which the second sector of the second Base Station 20 uses its receiver to act as an additional, supporting or only uplink receiver for the first sector of the first Base Station (acting temporarily as a covering cell).

This embodiment, which will be discussed below with reference to FIGS. 5 to 8, can be summarized as follows. The received uplink signal in the second sector of the second Base Station 20, from a UE 200 transmitting on the uplink in the covering cell on the first sector of the first base station 10, would be fully reported back to the first base station 10. Then, the first base station 10 could observe the reliability (that is, a weight) of the useful signal coming from the second sector of the second Base Station 20, when combining this signal with any signal received from the same UE 200 via the first Base Station 10 directly. Based on the weight of the useful signal observed, the first Base Station 10 may decide that the UE 200 is best served by the second sector of the second Base Station 20 in both the uplink and downlink. At that point the first sector of the first Base Station 10 could decide to activate the downlink transmission on the second sector of the second Base Station 20.

Figure 5:
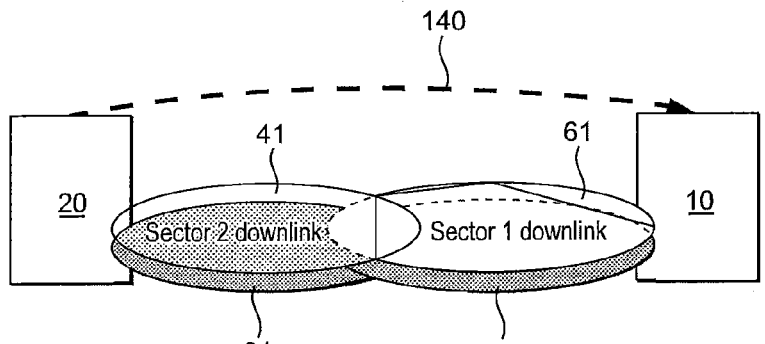
FIG. 5 shows a schematic illustration of a cellular network at a first stage according to a second embodiment of the system described herein.

Referring first to FIG. 5, there is shown a schematic illustration of a cellular network at a first stage according to the second embodiment of the system described herein. The cellular network comprises a first base station 10 and a second base station 20. In this initial condition, the uplink coverage area 51 and the downlink coverage area 61 for the first base station and the uplink coverage area 31 and the downlink coverage area 51 for the second base station are shown. At the first stage, the second Base Station 20 sends an indication communication 140 to the first Base Station 10 informing it that the second Base Station 20 has no traffic to serve on the second sector.

Figure 6:
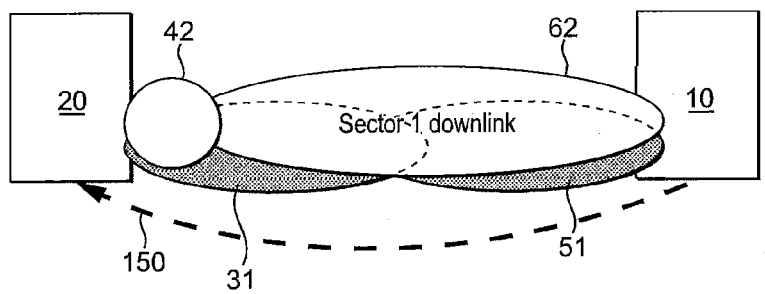
FIG. 6 shows a schematic illustration of the cellular network of FIG. 5 at a second stage.

FIG. 6 shows a schematic illustration of the cellular network of FIG. 5 at a second stage. The downlink transmission from the first sector of the first Base Station 10 is extended and the new downlink coverage area 62 of the first Base Station 10 is much greater than initially. The downlink transmission from the second sector of the second Base Station 20 is reduced based on a communication message 150 from the first Base Station 10 to the second Base Station 20 of the uplink channel information for common and dedicated channels that the receiver of the second Base Station 20 should search for. Nevertheless, the uplink coverage area 51 for the first Base Station 10 and the uplink coverage area 31 for the second Base Station 20 remain as they were initially.

Figure 7:
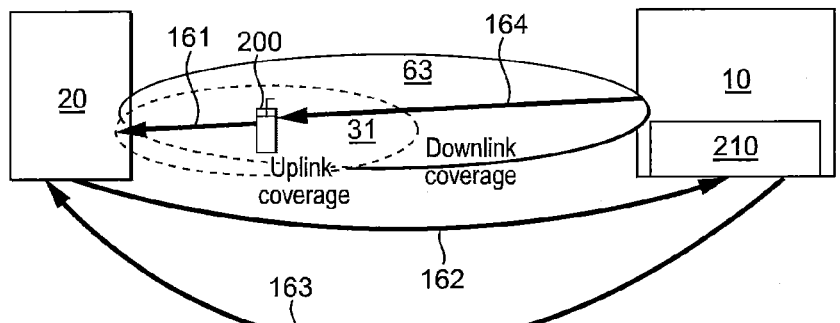
FIG. 7 shows a schematic illustration of the cellular network of FIG. 5 at a third stage.

Referring now to FIG. 7, there is shown a schematic illustration of the cellular network of FIG. 5 at a third stage. Here, the second sector of the second base station 20 has its cell transmission fully de-activated. Its downlink coverage area is no longer existent. The downlink coverage area 63 for the first sector of the first Base Station 10 is now covering this area fully and has been extended accordingly. The uplink coverage area 31 of the second Base Station 20 remains the same as it was initially.

The UE 200 is in a call using downlink transmission 164 coming from the first sector of the first Base Station 10, but the UE moves into the uplink coverage area of the second Base Station 20. Then, the uplink transmission 161 starts to be relayed through the second sector of the second Base Station 20 to the first Base Station 10 using backhaul communication 162.

A processor 210 determines once the weight of the useful signal received via the second sector of the second Base Station 20 is above a threshold. This may be an absolute threshold or relative to the received signal of the first sector of the first Base Station 10. Then, it sends an activation signal 163 from the first Base Station 10 to trigger the activation of the downlink cell transmission on the second Base Station 20 second sector.

Figure 8:
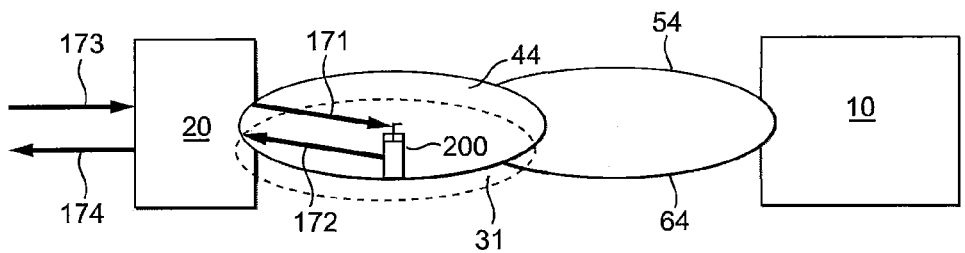
FIG. 8 shows a schematic illustration of the cellular network of FIG. 5 at a fourth stage.

Referring now to FIG. 8, this shows a schematic illustration of the cellular network of FIG. 5 at a fourth stage. Here, the cell transmission on the second sector of the second Base Station 20 has been increased in power so that the downlink coverage area 44 is now greater than before. The cell transmission on the first sector of the first Base Station 10 has been decreased in power so that the downlink coverage area 64 is now smaller than before. Essentially, the downlink coverage area 44 is now the same as the initial coverage area 41 and the downlink coverage area 64 is now the same as the initial coverage area 61. The UE 200 has made measurements to note that the second sector of the second Base Station 20 is providing better downlink coverage following the increase in power (this is desirably achieved by a gradual increase in power from the second base Station 20 and a decrease of downlink power from the first Base Station 10). Thus, the first Base Station 10 has decided to handover the UE 200 to the second sector of the second Base Station 20, where its call is served on both a downlink transmission 171 and an uplink transmission 172. The second Base Station 20 also receives downlink traffic 173 and sends uplink traffic 174 directly.

This embodiment may be particularly advantageous in a number of scenarios. One example is a shared carrier scenario, where the downlink transmissions from the first Base Station 10 and the second Base Station 20 are both using the same carrier frequency, f1. In particular, the UE 200 does not have sufficient uplink coverage to reach the first Base Station 10 receiver, although it is able to receive downlink common channel transmission from the first Base Station 10 transmitter. Then, this embodiment would help in the sense that the first Base Station 10 would have more flexibility in selecting the time at which it activates the downlink transmission of the second Base Station 20 cell. Therefore, the first Base Station 10 does not have to activate the cell prior to performing call setup, and instead can do the cell activation at a later stage. This enables a smooth operation and reduction in call setup delay, because the cell of the master Base Station does not need to pause the call setup process to move the UE 200 to the slave Base Station. Another case is when the UE 200 is already actively performing data transfer and is entering the virtual coverage area of the second sector of the second Base Station 20. In this case, the UE 200 may lose uplink coverage of the first sector of the first Base Station 10, but can continue transmitting data to the second Base Station 20 seamlessly. In both cases, the UE still has sufficient downlink coverage of the first sector of the first Base Station 10 whilst uplink transmissions are received at the second Base Station 20. If the downlink cell transmission on the second Base Station 20 is increased gradually, the UE 200 will have time to report this as the best cell, and receive a handover command from the first Base Station 10 to handover to the cell of the second Base Station 20, before the downlink transmission of the second Base Station 20 starts to cause too much interference to the downlink transmission of first Base Station 10. This advantageously reduces probability of call drop caused by lack of uplink coverage and/or too much downlink interference.

The reporting from the second sector of the second Base Station 20 could be performed with the receive antenna (the second sector of the second Base Station 20 acting as a diversity antenna), or as a diversity Node B in a Third or Fourth Generation cellular system. If the second Base Station 20 is acting as a diversity antenna, the first Base Station 10 would perform receiver diversity combining of the physical channel bits. If the second Base Station 20 is acting as a "diversity Node B", the data may be combined at transport block level (using macro-diversity combining) in the first Base Station 10.

Whichever type of diversity combining is used, the number of covered cells and covering cells could be one or more, as long as it is clear that in each transaction there is a master Base Station (for example, the first Base Station 10), and slave Base Station (for example, the second Base Station 20). In the case of more than one covering cell, for a UE performing RACH access, the slave Base Station would need to know which RACH access configuration settings are being used for which covering cell. This information would need to be provided to the slave Base Station from any Base Station acting as a master Base Station. Similarly, for users actively transferring data, the slave Base Station could be informed about which uplink physical channel configuration is being used by which UEs in which cell, such that the slave Base Station understands what data to report back to each master Base Station.

In the case of more than one covered cell for a covering cell, the master Base Station would desirably provide all of the relevant RACH and physical channel uplink configuration parameters it is using for each UE to all slave Base Stations.

This extension of the described embodiment would particularly help in the case where the UE does not have sufficient uplink coverage to reach a master Base Station receiver, although it is able to receive downlink common channel transmission from the master Base Station transmitter. It would help in the sense that the master Base Station has more flexibility in the time at which it must activate the cell of the slave Base Station, and does not have to do the activation prior to performing call setup, and instead can do the cell activation at a later stage. This enables a smooth operation and reduction in call setup delay, because the cell of the master Base Station does not need to pause the call setup process to move the UE to the slave Base Station.

There are a number of practical scenarios where the described embodiments can be used. In a first scenario, they may be used as relays for capacity. Here, the second sector of the second base station 20 is a relay, potentially using the first sector of the first base station 10 as backhaul to connect to the fixed network. The RACH parameters of the first sector of the first base station 10 can be received by the relay by receiving the system information of the first sector of the first base station 10. By redirecting the UE 200 to the second sector of the second base station 20, the UE 200 is able to experience a throughput boost in both downlink and uplink.

A second scenario involves using small cells for capacity. Here, the second sector of the second base station 20 is a small cell, and the first sector of the first base station 10 is a macro cell. The RACH parameter information can be retrieved by the second sector of the second base station 20 via transport network signalling communication with the first base station 10. By redirecting the UE 200 to the second base station 20, the UE 200 is able to experience a throughput boost in downlink and uplink.

A third scenario uses macro cells. In this case, both the first sector of the first base station 10 and the second sector of the second base station 20 are both macro cells. In the second and third scenarios, the downlink transmissions from the first and the second sectors may be on same carrier frequency (and not co-located) or different carrier frequencies (co-located or not co-located).

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for operating a cellular communications network including a first base station and a second base station, the method comprising:
   reducing the downlink transmission power of the second base station and increasing the downlink transmission power of the first base station, based upon the level of data traffic being communicated through the second base station;
   receiving at least one uplink transmission from a mobile station at the second base station and identifying that the second base station can provide a communications service to the mobile station;

communicating the at least one uplink transmission received from the mobile station at the second base station to the first base station;

receiving the at least one uplink transmission from the mobile station at the first base station; and combining, at the first base station, the at least one uplink transmission communicated from the second base station to the first base station and the at least one uplink transmission received at the first base station from the mobile station.

2. The method of claim 1, wherein the at least one uplink transmission received from the mobile station includes an initial uplink transmission from the mobile station or further uplink transmissions from the mobile station that are received at the second base station in response to the identification.

3. The method of claim 1, further comprising:

sending downlink transmissions from the first base station to the mobile station.

4. The method of claim 1, wherein the step of communicating the at least one uplink transmission received from the mobile station at the second base station to the first base station comprises communicating one of: (i) the at least one uplink transmission converted to baseband but undecoded; (ii) the at least one uplink transmission at least partially decoded; or (iii) the at least one uplink transmission fully decoded.

5. The method of claim 1, further comprising:

establishing that the second base station should provide an uplink communication service to the mobile station;

increasing the downlink transmission power of the second base station and reducing the downlink transmission power of the first base station in response to the establishment; and communicating further downlink transmissions from the second base station to the mobile station.

6. The method of claim 1, wherein the downlink transmissions for the first base station and the second base station are made on the same carrier frequency.

7. The method of claim 1, wherein the step of identifying that the second base station can provide a communications service to the mobile station comprises:

determining that the signal strength of the at least one uplink transmission from the mobile station as received at the second base station is at least a threshold value.

8. A method for operating a cellular communications network including a first base station and a second base station, the method comprising:

reducing the downlink transmission power of the second base station and increasing the downlink transmission power of the first base station, based upon a level of data traffic being communicated through the second base station;

receiving at least one uplink transmission from a mobile station at the second base station and identifying that the second base station can provide a communications service to the mobile station;

communicating information about the at least one uplink transmission from the second base station to the first base station, in response to the reception of the at least one uplink transmission at the second base station, the step of identifying that the second base station can provide a communications service to the mobile station being carried out at the first base station.

9. The method of claim 8, further comprising:

increasing the downlink transmission power of the second base station and reducing the downlink transmission power of the first base station in response to the identification; and communicating downlink transmissions from the second base station to the mobile station.

10. The method of claim 8, wherein the cellular communications network further comprises a third base station, the method further comprising:

receiving the at least one uplink transmission from the mobile station at the third base station; and communicating information about the at least one transmission from the third base station to the first base station in response to the reception of the at least one uplink transmission at the third base station; and wherein the step of identifying that the second base station can provide a communications service to the mobile station is carried out at the first base station and comprises identifying that the second base station can provide a better communications service to the mobile station than the first base station and the third base station.

11. The method of claim 8, wherein the at least one uplink transmission comprises an RRC Connection Request, the method further comprising:

transmitting one of: an RRC Connection Reject message; an RRC Connection Release message; and a handover message from the first base station to the mobile station, to direct the mobile station to receive downlink transmissions from the second base station.

12. A method reducing the downlink transmission power of the first base station, based upon the level of data traffic being communicated through the second base station, wherein the downlink transmission power of the first base station defines a coverage area for the first base station;

receiving at least one uplink transmission from a mobile station at the second base station and identifying that the second base station can provide a communications service to the mobile station;

instructing all mobile stations within the coverage area of the first base station to use a Random Access Channel associated with the first base station, in response to the step of increasing the downlink transmission power of the first base station; and wherein the second base station receives the at least one uplink transmission from a mobile station over the Random Access Channel associated with the first base station.

13. A cellular communications network, comprising:

a first base station, arranged to provide a first communications coverage area defined by its downlink transmission power;

a second base station, arranged to provide a second communications coverage area defined by its downlink transmission power; and a controller, arranged to cause a reduction in the downlink transmission power of the second base station and to cause an increase in the downlink transmission power of the first base station, based upon the level of data traffic being communicated through the second base station; and wherein the second base station is further configured to receive at least one uplink transmission from a mobile station and the controller is further configured to identify that the second base station can provide a communications service to the mobile station and, in response to the identification, enables the second base station to receive further uplink transmissions from the mobile station, wherein the second base station is further configured to communicate the at least one uplink transmission received from the mobile station at the second base station to the first base station, wherein the first base station is further configured to receive the at least one uplink transmission from the mobile station, and wherein the first base station is further configured to combine the at least one uplink transmission communicated from the second base station to the first base station and the at least one uplink transmission received at the first base station from the mobile station.

14. A non-transitory computer readable medium storing software for operating a cellular communications network including a first base station and a second base station, the software comprising:

executable code that reduces the downlink transmission power of the second base station and increases the downlink transmission power of the first base station, based upon the level of data traffic being communicated through the second base station; and executable code that receives at least one uplink transmission from a mobile station at the second base station and identifies that the second base station can provide a communications service to the mobile station;

executable that communicates the at least one uplink transmission received from the mobile station at the second base station to the first base station;

executable code that receives the at least one uplink transmission from the mobile station at the first base station; and executable code that combines, at the first base station, the at least one uplink transmission communicated from the second base station to the first base station and the at least one uplink transmission received at the first base station from the mobile station.

15. The non-transitory computer readable medium of claim 14, wherein the at least one uplink transmission received from the mobile station includes an initial uplink transmission from the mobile station or further uplink transmissions from the mobile station that are received at the second base station in response to the identification.

16. The non-transitory computer readable medium of claim 14, wherein the software further comprises:

executable code that increases the downlink transmission power of the second base station and reducing the downlink transmission power of the first base station in response to the identification; and executable code that communicates downlink transmissions from the second base station to the mobile station.

17. The non-transitory computer readable medium of claim 14, wherein the downlink transmissions for the first base station and the second base station are made on the same carrier frequency.

18. The non-transitory computer readable medium of claim 14, wherein the executable code that identifies that the second base station can provide a communications service to the mobile station comprises:

executable code that determines that the signal strength of the at least one uplink transmission from the mobile station as received at the second base station is at least a threshold value.

19. A non-transitory computer readable medium storing software for operating a cellular communications network including a first base station and a second base station, the software comprising:

executable code that reduces the downlink transmission power of the second base station and increasing the downlink transmission power of the first base station, based upon the level of data traffic being communicated through the second base station, wherein the downlink transmission power of the first base station defines a coverage area for the first base station;

executable code that receives at least one uplink transmission from a mobile station at the second base station and identifying that the second base station can provide a communications service to the mobile station;

executable code that instructs all mobile stations within the coverage area of the first base station to use a Random Access Channel associated with the first base station, in response to the step of increasing the downlink transmission power of the first base station; and wherein the second base station receives the initial uplink transmission from a mobile station over the Random Access Channel associated with the first base station.

* * * * *